United States Patent [19]

Clark

[11] 4,300,277
[45] Nov. 17, 1981

[54] PRESSURE FILTERS

[75] Inventor: Norman O. Clark, Par, England

[73] Assignee: English Clays Lovering Pochin & Company, Ltd., St. Austell, England

[21] Appl. No.: 87,208

[22] Filed: Oct. 22, 1979

Related U.S. Application Data

[63] Continuation-in-part of Ser. No. 856,493, Dec. 1, 1977, abandoned.

[30] Foreign Application Priority Data

Dec. 1, 1976 [GB] United Kingdom ............... 50191/76

[51] Int. Cl.³ .............................................. B03B 11/00
[52] U.S. Cl. ..................................... 29/450; 210/497.1
[58] Field of Search ............... 210/350, 354, 355, 356, 210/497 R, 497.1, 499, 500 R, 505, 507, 489, 484, 490, 232; 29/428, 450; 139/387 R

[56] References Cited

U.S. PATENT DOCUMENTS

| 2,396,712 | 3/1946 | Luttge et al. | 210/484 |
| 2,781,619 | 2/1957 | Gardes | 210/484 |
| 2,994,435 | 8/1961 | Moore | 210/484 |
| 3,383,278 | 5/1968 | Helland | 210/499 |
| 3,578,175 | 5/1971 | Manjikian | 210/489 |
| 3,750,889 | 8/1973 | Acosta | 210/497 |
| 3,753,499 | 8/1973 | Gwilliam | 210/350 |

Primary Examiner—William F. Smith
Attorney, Agent, or Firm—Weingram & Klauber

[57] ABSTRACT

A tube pressure filter is provided with a filter element comprising a filter cloth sleeve which is tailored from a woven material so that the warp and/or weft filaments extend helically around the inner tubular body on which the filter element is supported whereby the filter cloth sleeve can be stretched transversely of the length thereof.

5 Claims, 4 Drawing Figures

PRESSURE FILTERS

This application is a continuation-in-part of my copending application Ser. No. 856,493 filed Dec. 1st, 1977 abandoned and entitled IMPROVEMENTS IN OR RELATING TO PRESSURE FILTERS.

BACKGROUND OF THE INVENTION

This invention relates to pressure filters, and more particularly, is concerned with tube pressure filters incorporating a novel filter element and with a method of fitting said filter element on a tube pressure filter.

In recent years there has been developed a type of pressure filter, conveniently called a tube pressure filter, which is capable of operating at high pressures, for example pressures in excess of 1000 lbs/in$^2$, and which can be used to separate particulate solids and liquids which are not separable to the same extent by conventional plate filter presses. Various embodiments of tube pressure filter have been described, see for example British Patent Specifications Nos. 907,485; 1,194,676 and 1,271,494, but in general a tube pressure filter essentially comprises (a) a pair of generally coaxial inner and outer tubular bodies arranged one within the other and adapted to be supported in a generally upright position, (b) an impermeable elastic sleeve disposed within and secured to the outer tubular body, (c) a filter element disposed around and supported by the inner tubular body, (d) first outlet means whereby filtrate which has passed through the filter element can be discharged from the tube pressure filter, and (e) second outlet means whereby solid retained on said filter element can be discharged from the tube pressure filter, the arrangement being such that in a first operating condition of the tube pressure filter said second outlet means is closed and the tubular bodies co-operate with each other to define a closed annular chamber which is divided into generally coaxial and non-intercommunicating inner and outer compartments, the inner compartment having an inlet for feed material (comprising a mixture of a liquid and a particulate solid) and the outer compartment having an inlet for a hydraulic fluid under pressure, and in a second operating condition of the tube pressure filter said second outlet means is open to enable the particulate solid to be discharged from the inner compartment.

In one kind of tube pressure filter, the tubular bodies are movable relative to one another and the inner tubular body comprises a cylindrical central section, around which cylindrical central section there is disposed the filter element, and upper and lower end sections secured one to each end of the cylindrical central section, each of which end sections includes a portion (which generally co-operates with the adjacent portion of the outer tubular body to form the closed annular chamber when said tubular bodies are in their first operating condition) of greater diameter than said cylindrical central section; and the tube pressure filter further includes means for displacing the tubular bodies axially relative to one another whereby the tube pressure filter can be placed in either one of its first and second operating conditions. Embodiments of this kind of tube pressure filter are disclosed, for example, in U.S. Pat. No. 3,756,142. Hereinafter, such a tube pressure filter will be referred to as "a tube pressure filter of the kind set forth". Heretofore in tube pressure filters of the kind set forth the filter element has comprised a filter cloth sleeve which fits closely around the inner tubular body usually with a backing cloth and wire mesh sleeve being disposed between the filter cloth sleeve and the inner tubular body. Generally, the filter cloth sleeve has been woven and tailored to a shape and size enabling it to be fitted directly as a replacement for a filter cloth sleeve which has been damaged or whose interstices have been blocked by solid particles. When these known filter cloth sleeves are fitted on the inner tubular body the warp and weft filaments thereof run longitudinally and circumferentially of the inner tubular body and it is not possible to stretch the filter cloth sleeve laterally by more than a very small amount, say 5% at the most. With some forms of tube pressure filter of the kind set forth the fitting (sometimes known as the dressing) of the filter element is rendered more difficult by the fact that the end sections of the inner tubular body have a significantly larger diameter than the cylindrical central section which supports the filter cloth sleeve, so that in order to fit the filter cloth sleeve at least one of the end sections of the inner tubular body has to be removed, with a consequential expenditure of time and effort.

SUMMARY OF THE INVENTION

According to one aspect of the present invention there is provided a tube pressure filter of the kind set forth comprising (a) a pair of generally coaxial inner and outer tubular bodies arranged one within the other and adapted to be supported in a generally upright position, the tubular bodies being movable relative to one another and the inner tubular body comprising a cylindrical central section, and upper and lower end sections secured one to each end of said central cylindrical section, each of which end sections includes a portion of greater diameter than said cylindrical central section, (b) an impermeable elastic sleeve disposed within and secured to the outer tubular body, (c) a filter element disposed around and supported by the cylindrical central section of the inner tubular body, (d) first outlet means whereby filtrate which has passed through the filter element can be discharged from the tube pressure filter, (e) second outlet means whereby solid retained on said filter element can be discharged from the tube pressure filter, and (f) means for moving the tubular bodies relative to one another whereby the tube pressure filter can be placed in either one of two operating conditions, wherein the arrangement is such that in one operating condition of the tube pressure filter said second outlet means is closed and the tubular bodies co-operate with each other to define a closed annular chamber which is divided into generally coaxial and non-inter-communicating inner and outer compartments by said impermeable elastic sleeve, the inner compartment having an inlet for feed material (comprising a mixture of a liquid and a particulate solid) and the outer compartment having an inlet for a hydraulic fluid under pressure, and in the other operating condition of the tube pressure filter said second outlet means is open to enable the particulate solid to be discharged from the inner compartment; and wherein the improvement comprises providing said tube pressure filter with a filter element comprising a filter cloth sleeve which is tailored from a woven material so that the warp and/or weft filaments of said woven material extend helically around the inner tubular body on which the filter element is supported, whereby said filter cloth sleeve can be stretched laterally and drawn over said portions of the end sections which are of greater diameter than said cylindrical central section, and thereafter can be streched longitudinally along the length of said central section, for facilitating emplacement or replacement of said filter cloth sleeve.

The filter cloth sleeve is advantageously woven from a material such that and tailored in a manner such that the degree of lateral stretching which can be obtained is in the range of from about 8% to about 20%, and most preferably is in the range of from about 9% to about 15%. The filter cloth sleeve should not be capable of being stretched laterally by more than about 20% since this would result in the filter cloth sleeve having a tendency to balloon out under the action of the compressed air which is usually employed to discharge the filter cake and this would make discharge of the filter cake difficult. Furthermore, the filter cloth sleeve should have an unstretched diameter which is larger than the outer diameter of the central cylindrical section of the inner tubular body of the tube pressure filter, and which preferably lies about midway between the diameter of the cylindrical central section and the greatest diameter of the end sections of the inner tubular body. Most preferably, the filter cloth sleeve has an unstretched diameter which is at least 5% more than the diameter of the central cylindrical section of the inner tubular body. To achieve the desired degree of lateral stretching the filter cloth sleeve used should generally be tailored so that when fitted on the inner tubular body of the tube pressure filter neither the warp nor the weft filaments extend helically around the inner tubular body at a helix angle greater than 55°. Preferably the warp filaments extend helically around the inner tubular body at a helix angle in the range of 9° to 30°. The extent to which a filter cloth sleeve can be stretched laterally is also influenced by the weight and openess of the weave of the material from which the filter cloth sleeve is woven. It has been found, for example, that a filter cloth sleeve made up from a cloth having a weight of 5 oz per square yard stretches better than a filter cloth sleeve made up from a cloth having a weight of 7 oz per square yard. The lighter cloth has warp and weft filaments of smaller diameter and a slightly more open weave than the heavier cloth. In general, therefore, the filter cloth sleeve should be woven from a cloth which has a weight of not more than 8 oz per square yard. Also, the heavier is the cloth the greater should be the helix angle of the weft or warp filaments. The nature of the material of the cloth does not appear to be important; for example, polyester cloth having a weight of 5 oz per square yard seems to perform in the same way as a nylon cloth of the same weight. The amount of lateral stretching which is required depends in part upon the outer diameter of the cylindrical centre section of the inner tubular body. For example, when the diameter of the cylindrical central section of the inner tubular body is relatively small, the degree of stretch required to pull the filter cloth sleeve over the larger end section is very much greater than when the diameter of the cylindrical centre section of the inner tubular body is relatively large. This is because the difference between the greatest diameter of the end sections and the outer diameter of the cylindrical central section is substantially the same regardless of the actual diameters so that the degree of lateral stretching required in the case of a small diameter tube pressure filter is much greater than with a large diameter tube pressure filter. Accordingly, it is preferred that a tube pressure filter in accordance with the present invention should have an inner tubular body with a cylindrical central section whose outer diameter is at least 6 inches and most preferably is at least 10 inches.

As noted above, the diameter of the filter cloth sleeve preferably lies about midway between the diameters of the cylindrical central section and the end section. For example, one embodiment of a tube pressure filter of the kind set forth which can be used for dewatering china clay and other minerals has an inner tubular body with a cylindrical central section which has an outer diameter of 10.625 inches, and with end sections which have a greatest diameter of 13 inches; and it has been found that in this case the filter cloth sleeve advantageously has an unstretched diameter of 11.875 inches. Although the filter cloth sleeve can be tailored so that the warp or weft filaments have a helix angle of up to 55°, it is preferred that the helix angle does not exceed 30°. For example, for a tube pressure filter having an inner tubular body with a cylindrical central section of diameter 16 inches, and end sections of greatest diameter 18.70 inches, the filter cloth sleeve is advantageously cut from a 5 oz/square yard cloth of either nylon or "TERYLENE" with a helix angle of 10° and an unstretched diameter of 17.03 inches. In this case, the degree of stretch required to enable one to pull the filter cloth sleeve over the enlarged end sections was 9.8%. If there is used a cloth of nylon or "TERYLENE" of weight 7 or 8 oz/square yard (in order to provide a smaller pore size and therefore trap finer solid particles), the preferred cloth has a helix angle of $22\frac{1}{2}°$ and an unstretched diameter of 16.87 inches. In this case, for the same inner tubular body, the degree of stretch required is therefore 10.9%.

When fitting the filter cloths it is advantageous to soak the cloths in water containing a detergent, for example that sold under the trade name of "TEEPOL", in order to lubricate the cloths sufficiently to pull them over the enlarged end sections.

One method of producing a filter cloth sleeve for use in the present invention is to cut a rectangular piece of cloth from a web of conventionally woven cloth (which may be, for example, a polyester, such as "TERYLENE", or a nylon) so that the sides of the rectangle make the desired helix angle with the sides of the web, and then to overlap and sew together the longer sides of the rectangle. In order to cut a rectangle of a length such that, when the longer sides of the rectangle are brought together to form a sleeve, the length of the sleeve is a little longer than the cylindrical central section of the inner tubular body, it may be necessary to join two webs of cloth side by side. When a filter cloth sleeve tailored in accordance with the invention has been drawn over the end section of the inner tubular body, the filter cloth sleeve can be stretched along the length of the cylindrical central section of the inner tubular body and clipped at each end to retain it in position.

According to another aspect of the invention there is provided a method for emplacing or replacing a filter element of a tube pressure filter of the kind set forth wherein said method comprises fabricating said filter element as a sleeve which is tailored from a woven material so that the warp and/or weft filaments of said woven material extend helically around the inner tubular body on which the filter element is supported, whereby said sleeve may be stretched transversely of the length thereof; and emplacing or replacing said sleeve in said tube pressure filter of the kind set forth by stretching said sleeve transversely of its length, drawing said sleeve over said portion of said end section which is of greater diameter than said cylindrical central section; and thereupon pulling said sleeve along the length of said cylindrical central section, and applying means to retain said sleeve in position.

A filter element made and fitted in accordance with the invention can be removed easily from and fitted easily on the inner tubular body of a tube pressure filter of the kind set forth without recourse to mechanical operations such as are involved in removing one of the end sections of the inner tubular body of the tube pressure filter.

For a better understanding of the invention, and to show more clearly how the same may be carried into effect, reference will now be made, by way of example, to the accompanying drawings in which.

Figure 1:
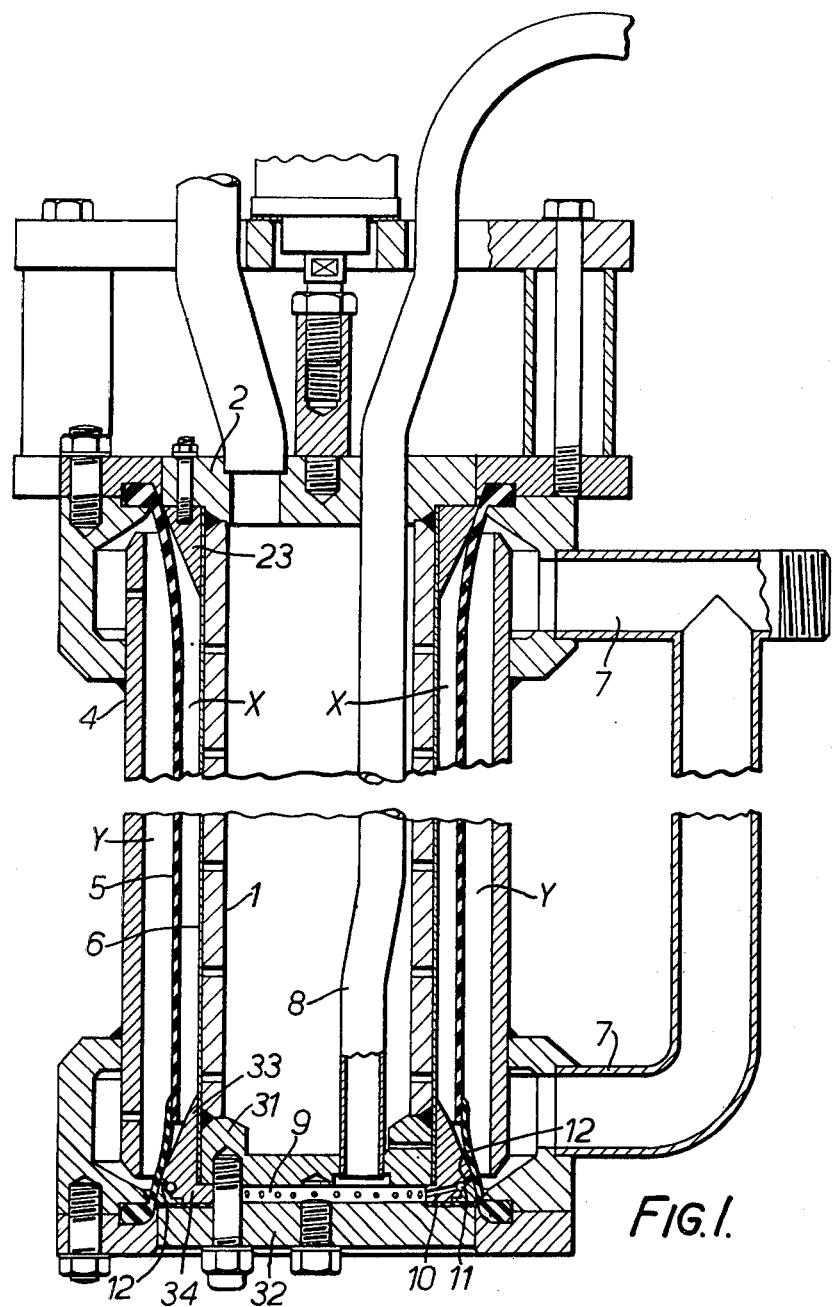
FIg. 1 shows in longitudinal section a tube pressure filter of the kind set forth.

Referring first to FIG. 1, there is shown a tube pressure filter of the kind set forth whose construction and method of operation are generally in accordance with the construction and method of operation of the tube pressure filters described in British Patent Specifications Nos. 1,240,465 and 1,351,142.

Briefly, the tube pressure filter comprises an inner tubular body having a cylindrical central section 1, an upper end section 2 which includes a fairing 23, and a lower end section which includes an inner cap 31 and an outer cap 32 separated from the inner cap 31 by a ring member 34 which includes a portion constituting a fairing 23. An ante-chamber 9 is defined between the inner cap 31, the outer cap 32 and the ring member 34. A feed conduit 8 passes through the upper end section 2 and the inner cap 31 and debouches into ante-chamber 9. A feed mixture can flow through the conduit 8 and enter the ante-chamber 9 from where it can pass through a plurality of ducts 10, a toroidal chamber 11 and, finally, through a narrow annular aperture 12 into the inner compartment X of the tube pressure filter. A filter element comprising a filter cloth sleeve 6 is supported on the inner tubular body. The filter element is clamped at its lower end between the fairing 33 and the lower end of cylindrical central section 1 and inner cap 31, and at its upper end between the fairing 23 and the upper end of cylindrical central section 1. The tube pressure filter also comprises an outer tubular body 4, and an impermeable elastic sleeve 5 secured to the outer tubular body 4. The impermeable elastic sleeve 5 divides the annular chamber formed between the inner and outer tubular bodies into non-intercommunicating inner and outer compartments X and Y respectively. The outer compartment Y is connected with an inlet/-outlet 7 for hydraulic fluid under pressure.

Figure 2:
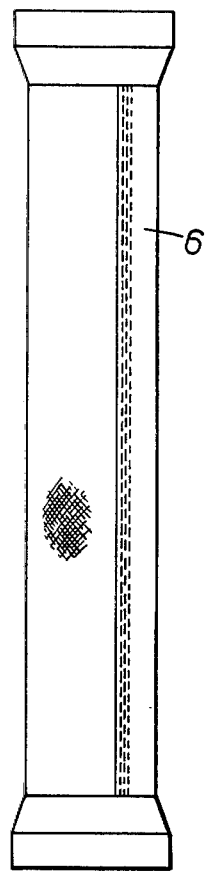
FIG. 2 shows the inner tubular body of the tube pressure filter of FIG. 1 fitted with one embodiment of a filter element according to the invention.
Figure 3:
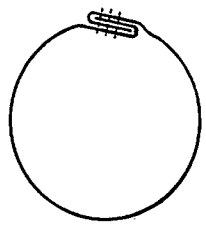
FIG. 3 shows in cross-section a filter cloth sleeve.

Referring now to FIG. 2, there is shown the inner tubular body of the tube pressure filter on which a filter element in accordance with the invention has been fitted. The filter element comprises a filter cloth sleeve 6 which is tailored so that when fitted on the inner tubular body, the warp and weft filaments each make a helix angle of 45° with the longitudinal axis of the inner tubular body. The filter cloth sleeve is produced by cutting a rectangular piece of cloth from a web of conventionally woven cloth so that the sides of the rectangular piece of cloth make an angle of 45° with the sides of the web. The two longer sides of the rectangular piece of cloth are then brought together and overlapped as shown in FIG. 3, four thicknesses of cloth being sewn together with three line of stitching.

Figure 4:
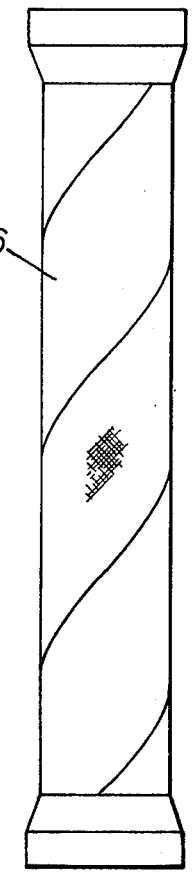
FIG. 4 shows the inner tubular body of a tube pressure filter fitted with another embodiment of a filter element according to the invention.

FIG. 4 shows the inner tubular body of a tube pressure filter on which there is fitted another embodiment of a filter element in accordance with the invention. In this embodiment the filter cloth sleeve 6 is formed by cutting a long narrow rectangle of cloth out of a web of cloth at the appropriate angle, winding the long narrow rectangle of cloth around the former in a helix with the edges overlapping, and then sewing the edges together.

What is claimed is:

1. A method for emplacing or replacing a filter element of a tube pressure filter, the tube pressure filter comprising (a) a pair of generally coaxial inner and outer tubular bodies arranged one within the other and adapted to be supported in a generally upright position; (b) an impermeable elastic sleeve disposed within and secured to the outer tubular body; (c) a filter element disposed around and supported by the inner tubular body; (d) first outlet means whereby filtrate which has passed through the filter element can be discharged from the tube pressure filter; and (e) second outlet means whereby solids retained on said filter element can be discharged from the tube pressure filter, wherein the inner tubular body comprises a cylindrical section around which central section there is disposed the filter element, and upper and lower end sections, each of which end sections includes an enlarged portion of greater diameter than said cylindrical central section, and wherein the arrangement is such that in a first operating condition of the tube pressure filter said second outlet means is closed and the tubular bodies cooperate with each other to define a closed annular chamber which is divided into generally coaxial and non-intercommunicating inner and outer compartments by said impermeable elastic sleeve, the inner compartment having an inlet for feed material (comprising a mixture of a liquid and a particulate solid) and the outer compartment having an inlet for hydraulic fluid under pressure; and in a second operating condition of the tube pressure filter said second outlet means is open to enable the particulate solid to be discharged from the inner compartment; and said method for emplacing or replacing said filter element comprising: fabricating said filter element as a filter cloth sleeve which is tailored from a woven material so that the warp and/or the weft filaments of said woven material extend helically around the inner tubular body on which the filter element is supported at a helix angle in the range of from 9° to 30°; the said filter cloth sleeve being stretchable laterally in the range of from about 8% to about 20%, and the said sleeve having an unstretched diameter which is at least 5% larger than the diameter of the cylindrical center section of the inner tubular body of the tube pressure filter; whereby said sleeve may be stretched transversely or along the length thereof; and whereby emplacing or replacing of said sleeve at said tube pressure filter may be effected by stretching said sleeve transversely of its length, drawing said sleeve over said enlarged portion of said end section, and thereupon stretching said sleeve along the length of said central section, and applying means to retain said sleeve in position.

2. A method according to claim 1 which comprises fabricating said filter element from a woven material having a weight not greater than 8 oz/square yard.

3. A method according to claim 2, wherein said woven material is tailored so that the filter cloth sleeve can be stretched laterally by an amount in the range of from about 9% to about 15%.

4. A method according to claim 1, wherein the woven material is tailored so that it has an unstretched diameter less than the diameter of said enlarged portion of said end section.

5. A method as claimed in claim 1, wherein the cylindrical central section of the inner tubular body has an outer diameter of at least 10 inches.

* * * * *